United States Patent [19]
Cowie

[11] 3,782,686
[45] Jan. 1, 1974

[54] TAPS

[75] Inventor: George Raymond Cowie, Middlesborough, England

[73] Assignee: Cowie Scientific Limited, Yorkshire, England

[22] Filed: June 19, 1972

[21] Appl. No.: 264,066

[30] Foreign Application Priority Data
June 18, 1971 Great Britain.................. 28,628/71

[52] U.S. Cl. ............................................ 251/309
[51] Int. Cl............................................. F16k 5/02
[58] Field of Search................. 251/309, 310, 311, 251/312, 313, 314, 315

[56] References Cited
UNITED STATES PATENTS

| | | | |
|---|---|---|---|
| 3,228,654 | 1/1966 | Olliff, Jr................ | 251/309 |
| 3,434,691 | 3/1969 | Hamilton................ | 251/309 X |
| 3,467,356 | 9/1969 | Mueller................. | 251/309 X |
| 2,854,027 | 9/1958 | Kaiser et al............ | 251/310 X |
| 3,012,752 | 12/1961 | Buck................... | 251/314 X |
| 3,512,944 | 5/1970 | Craig et al............ | 251/309 |
| 3,415,299 | 12/1968 | Hinman, Jr. et al..... | 251/309 UX |
| 3,525,363 | 8/1970 | Gore et al............. | 251/309 X |
| 3,582,042 | 6/1971 | Grenier................ | 251/309 |
| 3,678,960 | 7/1972 | Leibinsohn............ | 251/309 X |

Primary Examiner—Samuel Scott
Attorney—E. F. Wenderoth et al.

[57] ABSTRACT

This invention relates to a plug and socket type stopcock, notably for use in high vacuum apparatus, in which erosion of the fluorinated hydrocarbon polymer plug is reduced by indenting the plug face around the orifices of the bore through the plug.

9 Claims, 2 Drawing Figures

PATENTED JAN 1 1974   3,782,686

TAPS

The present invention relates to taps, notably to stopcocks for use in glass apparatus which is subjected to high vacuum.

In glass apparatus, the ground glass surfaces of the conventionally used tapered plug and socket type twist stopcocks often lock and prevent smooth operation of the stopcock. It has been the practice to grease the stopcock plug to render its operation smooth, but this leads to grease contamination of material flowing through the stopcock. It has been proposed to form part or all of the plug from a material with a low coefficient of friction, such as polytetrafluoroethylene. However, it has been found that the material of the plug surrounding the bore through the plug is rapidly eroded away, especially where stopcocks having such plugs are used in high vacuum apparatus, and that the stopcock fails to hold a high vacuum.

The present invention relates to a form of stopcock plug wherein this erosion problem is reduced.

Accordingly, from one aspect the present invention provides a fluorinated hydrocarbon polymer stopcock plug of generally frusto-conical shape having a transverse bore therethrough, the surface of the plug being indented at an orifice of the bore to provide a flatted surface around that orifice of the bore.

From another aspect, the invention provides a tapered plug and socket twist valve wherein the plug is made from a fluorinated hydrocarbon polymer and has a generally frusto-conical shape, there being a transverse bore through said plug adapted to be placed in register with apertures in the socket wall, the surface of the plug being indented at an orifice of the bore to provide a flatted surface around that orifice of the bore, which surface is of greater dimensions than the diameter of the apertures in the socket wall.

The plug and stopcock of the invention are of essentially the same design, size and purposes as those in plug and socket type twist valves used hereto, escept for the flatted surface on the plug. Desirably, flatted surfaces are provided at each orifice of the bore. Moreover, the bore may be branched or forked to provide a three way twist valve, in which case there will be three flats on the surface of the plug.

The flatting of the surface has two effects:

a. by reducing the area of contact between the plug and the wall of the socket bowl, it increases the contact pressure between the wall and the unflatted portions of the plug thus ensuring a better seal; and b. by removing material from the orifices of the bore through the plug, the risk of the material at the rim of the orifice being drawn into the apertures in the wall of the socket by cold flow of the plug material and then nipped off as the plug is rotated is reduced.

In general, the greater the surface of the plug which is indented to provide the flatted surface, the greater will be these effects. However, it will be appreciated that sufficient unflatted surface of the plug must remain to close the apertures in the socket wall. In general, it is desired that each sealing unflatted surface between the indented surfaces on the plug measures in all directions at least 1½ times the diameter of the aperture in the socket wall it is to seal. Desirably, the tangential dimension of this surface at the level of the socket aperture is not more than about three socket aperture diameters in size, e.g., about two diameters in size. It is preferred that the indented flatted area extend approximately one half to two, preferably about one, socket aperture radii around the mouth of the socket aperture when the plug bore and the socket aperture are in register. It will be appreciated that the flatted surface must not extend over the whole longitudinal length of the plug unless steps are taken to seal the plug in the socket. Furthermore, it is preferred that the flatted surface be disposed substantially symmetrically about the orifice of the plug bore, except where the bore and the socket wall aperture are offset.

The indented surface need not be a flat planar surface, but may be rounded as occurs when the indented surface forms a concave dishing of the plug surface, when the indented surface is a recessed convex surface or when the surface is concave. The term flatted surface is used herein to denote generically both flat and rounded surfaces. Preferably the indented surface is a substantially flat surface passing through a chord of the cross-section of the plug and lying in a plane substantially parallel to the longitudinal face of the plug.

The plugs are made from a fluorinated hydrocarbon polymer having a low coefficient of friction and a measure of flexibility so that they deform to compensate for minor irregularities in the socket, which latter is made for example from glass. Preferred polymers for present use are fluorinated alkene or fluorinated chlorinated alkene polymers, notably polytetrafluoroethylene.

The plugs may be made by any suitable method and the flat surfaces formed on the plug either ab initio or by the subsequent removal of material from a frusto-conical plug. It is preferred to provide the non-flatted surfaces of the plug with a highly polished surface and this is conveniently done by a centreless grinding technique.

The socket in which the plug is housed is of conventional type and the bowl is desirably given a highly polished finish. We have also found that it is desirable to bell the mouths of the apertures in the socket wall. Where this is done it will be appreciated that the diameter of the wide end of the bell is the diameter of the socket wall aperture to be considered when determining the dimensions of the plug to be used in the socket.

A typical stopcock of the invention will be described by way of example with respect to the accompanying drawings, in which.

The stopcock comprises of frusto-conical socket 1 having diametrically opposed bell mouthed apertures 2 and 3 in the wall thereof which lead to tubes 4 and 5. The socket and tubes are made of borosilicate glass and the bowl of the socket is ground and polished in the conventional manner. Within socket 1 is located a frusto-conical plug 6 made from polytetrafluoroethylene. The plug 6 is of substantially the same size and shape as the bowl of socket 1 so as to provide sealing engagement between the walls of the plug and the socket bowl.

Figure 2:
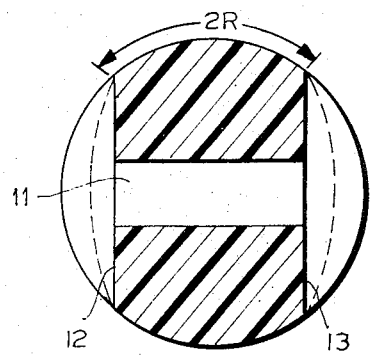
FIG. 2 is a transverse section through the plug on the line A—A.

The plug is provided with a T piece top 7 by which it may be rotated in the bowl and with a threaded longitudinal extension 8 which carries washers 9 and locknut 10 whereby the plug is secured in position and urged into sealing engagement with the socket bowl. The plug is also provided with a transverse bore 11 therethrough which can be placed in or out of register with the apertures 2 and 3 in the socket wall. The surface of the plug has been cut away around the orifices of the bore 11 to provide two flatted surfaces in a plane parallel to the face of the plug. As can be seen from FIG. 2 the surfaces may be cut on parallel chords 12 and 13 of the cross sectiion of the plug or be rounded as indicated by the dotted lines. Typically, for a 6 mm radius plug the flatted surface is indented about 0.6 mms into the plug at the centre of the chord. The unflatted portions each extend about 2R tangentially and the flatted indented surfaces extend about 2R longitudinally, R being the diameter of the mouth of the apertures 2 and 3. Such a plug is capable of holding a high pressure differential, even after repeated actuations.

The above description has been given in terms of a plug having two flatted surfaces. However, this need not be the case and only one flatted surface may be provided where the stopcock is to be subjected to comparatively low pressure differentials. In this case, the stopcock is to be located so that in use the flatted surface of the plug is on the low pressure side of the stopcock.

Figure 1:
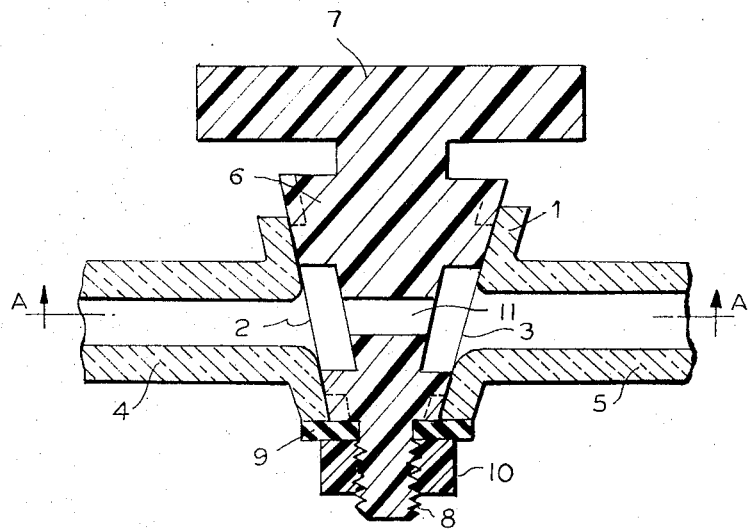
FIG. 1 is a vertical section view of the plug and socket.

In a further modification of the plug of the invention, the upper and lower extremities of the plug are of reduced diameter, e.g., as shown in shading in FIG. 1, to reduce yet further the area of contact between the plug and the socket bowl. This results in an increase in effect (a) referred to earlier.

I claim:

1. A fluorinated hydrocarbon polymer stopcock plug of generally frusto-conical shape having a transverse bore therethrough, characterised in that the surface of the plug is indented at an orifice of the bore to provide a flatted surface around that orifice of the bore.

2. A plug as claimed in claim 1 characterised in that the indented flatted surface is a generally flat surface passing through a chord of the cross section of the plug and lying in a plane substantially parallel to the longitudinal face of the plug.

3. A plug as claimed in claim 1 characterised in that the upper and lower extremities of the plug are of reduced diameter.

4. A tapered plug and socket twist valve wherein the plug is made from a fluorinated hydrocarbon polymer and has a generally frusto-conical shape, there being a transverse bore through said plug adapted to be placed in register with apertures in the socket wall, characterised in that the surface of the plug is indented at an orifice of the bore to provide a flatted surface around that orifice of the bore, which surface is of greater dimensions than the diameter of the apertures in the socket wall.

5. A valve as claimed in claim 4 characterised in that the indented surface on the plug extends around the mouth of the aperture in the socket wall from one half to two times the radius of the aperture in the socket wall when the plug bore and the aperture in the socket wall are in register.

6. A valve as claimed in claim 4 wherein each orifice of the transverse bore is adapted to communicate with only one aperture in the socket wall at a time.

7. A valve as claimed in claim 4 characterised in that each unflatted sealing surface between the indented surfaces on the plug measures in all directions at least 1½ times the diameter of the aperture in the socket wall which it is to seal.

8. A valve as claimed in claim 5 characterised in that each unflatted sealing surface between the indented surfaces on the plug measures tangentially at the level of the aperture in the socket wall not more than 3 times the diameter of the aperture in the socket wall which it is to seal.

9. A tapered plug and socket twist valve wherein the plug is made from a fluorinated hydrocarbon polymer and has a generally frusto-conical shape, there being a transverse bore through said plug adapted to be placed in register with apertures in the socket wall, characterised in that the surface of the plug is indented at an orifice of the bore to provide a flatted surface around that orifice of the bore, which surface extends around the mouth of the aperture in the socket wall from one half to two times the radius of the aperture in the socket wall when the plug bore and the aperture in the socket wall are in register; and in that each unflatted sealing surface between the indented surface on the plug measures in all directions from 1½ to 3 times the diameter of the aperture in the socket wall which it is to seal.

* * * * *